Sept. 8, 1970 R. L. PAIDOSH 3,527,943
APPARATUS FOR RECORDING AND RETRIEVING
INFORMATION BY THE USE OF X-RAYS
Filed April 25, 1966 2 Sheets-Sheet 1

INVENTOR.
RICHARD L. PAIDOSH
BY
Carpenter, Kinney & Coulter
ATTORNEYS

Sept. 8, 1970 R. L. PAIDOSH 3,527,943

APPARATUS FOR RECORDING AND RETRIEVING INFORMATION BY THE USE OF X-RAYS

Filed April 25, 1966 2 Sheets-Sheet 2

INVENTOR.
RICHARD L. PAIDOSH
BY
Carpenter, Kinney & Coulter
ATTORNEYS

United States Patent Office 3,527,943
Patented Sept. 8, 1970

3,527,943

APPARATUS FOR RECORDING AND RETRIEVING INFORMATION BY THE USE OF X-RAYS

Richard L. Paidosh, St. Anthony, Minn., assignor to Minnesota Mining and Manufacturing Company, St. Paul, Minn., a corporation of Delaware Filed Apr. 25, 1966, Ser. No. 544,921
Int. Cl. G03b *41/16*
U.S. Cl. 250—65 7 Claims

ABSTRACT OF THE DISCLOSURE

Apparatus for and method of retrieving information from a medium which differentially emits photon energy representative of information prerecorded thereon when it is uniformly struck by X-rays. The apparatus comprises means for producing a beam of X-rays, means for positioning a said medium in the beam of X-rays and means for sensing the photon energy emitted by said medium and converting it into an electrical signal. The method comprises the steps of producing a beam of X-rays, positioning a said medium in the beam of X-rays and sensing the photon energy emitted by said medium.

This invention relates to new and useful apparatus and methods for electrically retrieving information stored in a prerecorded recording medium capable of being excited by X-rays to produce differential photon energy representing the stored information.

Because of the necessity for relatively high vacuum environments when utilizing electron beams for recording and reading out of information from storage media, there has been a long felt need in the art for methods and means whereby electron beams can be utilized in information storage and retrieval without the necessity of exposing such media to high vacuum conditions during recording and/or readout. Heretofore it has been proposed to record information by isolating the electron beam from the recording media by utilizing a transducer anode positioned between recording media and electron beam (see U.S. Pat. Nos. 2,716,048, 3,176,137, and 3,056,025). However so far as is known, no one has heretofore utilized a transducer anode in combination with both electron beam means and photon sensing means for retrieving information from prerecorded sheet-like media capable of fluorescing, thereby enabling one to maintain such media under atmospheric conditions outside of the electron beam vacuum chamber.

Accordingly, one aspect of the present invention relates to apparatus for electrically retrieving information from a prerecorded sheet-like medium adapted to differentially emit photon energy at various levels from one face thereof in a manner representative of prerecorded information when such medium is struck in a controlled manner by X-rays generated by an electron beam.

Another aspect of this invention relates to methods for information readout from such prerecorded fluorescent media using an isolated electron beam to generate X-rays which controllably interposed excite such media.

An object of this invention is to make an improved information retrieval system.

Another object is to provide apparatus and methods for using an electron beam to retrieve information from a prerecorded fluoresceable recording medium without having to place such medium in the high vacuum chamber wherein the electron beam exists.

Other and further objects will become apparent to those skilled in the art from a reading of the present specification taken together with the drawings wherein.

Figure 1:
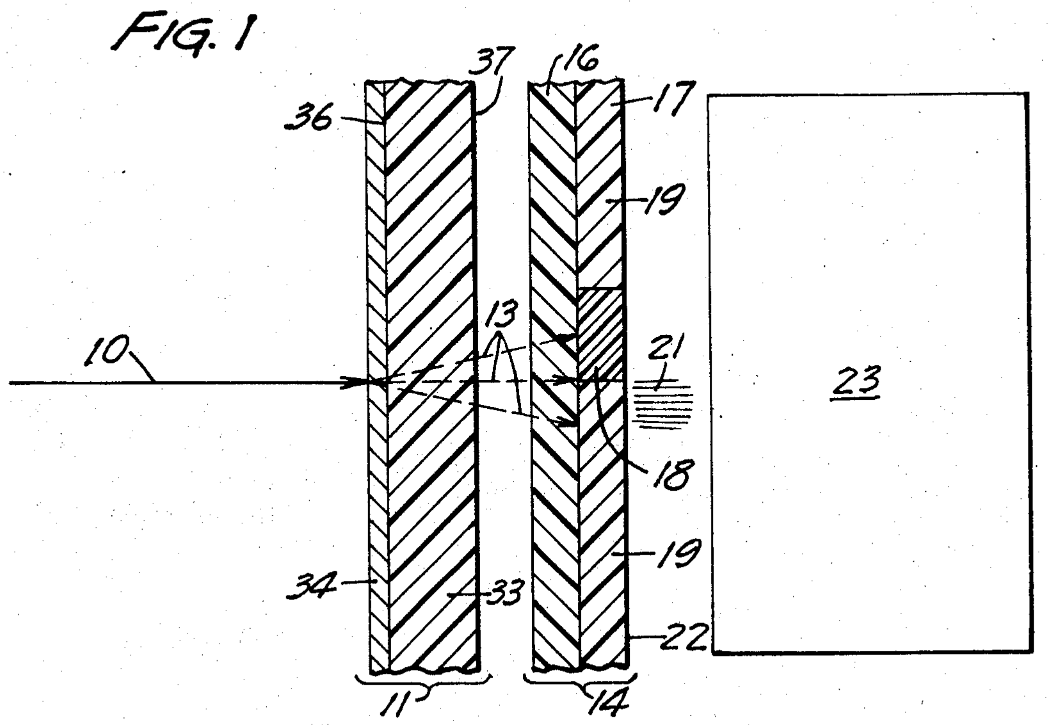
FIG. 1 is a schematic diagram illustrating one embodiment suitable for the practice of this invention.

The present invention relates to apparatus and methods for retrieving information electrically from a prerecorded differentially fluoresceable medium. In addition to such a medium, the invention employs means for generating and directing an electron beam along a predetermined path, a transducer anode positioned across such path, means for positioning such a medium in proximity to such transducer anode, and photon sensing means for both sensing photon energy emanating from such a medium and converting same into an electrical signal output.

In general, media suitable for use in the practice of this invention can be any known sheet-like structure which may be imaged (and developed, if necessary) by some form of energy so as to effect recordation of information therein, and which can thereafter be made to fluoresce differentially when irradiated by X-rays in a manner representative of the originally recorded information. In a medium construction, imaging material and fluorescent material can be in layered form adjacent one another. Commonly these layers are supported by a backing member. The fluorescent material is so distributed in such a medium construction as to be uniformly emissive of its characteristic photon energy output relative to one face of the medium when uniformly excited by X-rays. The imaging material therein is capable of being selectively altered as by some form of information modulated electromagnetic energy during a previous recording operation so as to record therein the information. Examples of suitable imaging materials include silver halide emulsions, diazo materials, thermographic materials, and the like. Examples of suitable fluorescent materials include scintillators and phosphors. Examples of backing members include organic polymers such as cellulose, polyesters, polypropylene, and the like. Some media may additionally contain a conductive layer, such as one composed of a vapor depositable metal or the like. One suitable class of media is disclosed in British Pat. No. 989,526.

Before being used in the practice of the present invention, such a medium is prerecorded in a recording operation so that the imaging material in a medium is selectively altered in its capacity to transmit or absorb either the characteristic photon energy output of the excited fluorescent material in the medium or uniform incident X-radiation, depending on the readout embodiment or configuration employed. The result is that when a prerecorded medium is readout in accordance with this invention, a uniform pattern of X-rays striking a localized area on one face of the prerecorded medium causes differential photon energy to be emitted from one face thereof (either the same face or the opposed face). Such differential photon energy emission is produced by the manner in which the imaging material has been selectively altered in a previous recording operation. The differential photon energy emission is, therefore, characteristically and systemmatically representative of the original prerecorded information.

For purposes of this application, X-radiation generally has reference to electromagnetic radiation having wave lengths falling in the range from about 0.1 to 30A. Similarly, the term "photon energy" has reference to electromagnetic radiation having wave lengths falling in the range from about 3,500 to 6,900 A. Usually, for purposes of this invention, photon energy will be visible light.

Means for generating and directing an electron beam along a predetermined path are well known to those of ordinary skill in the art. The present invention is illustrated by reference of one embodiment of such means as described hereinafter.

A transducer anode is used in this invention to convert the energy of incident electrons into X-rays emanating from the face of the transducer anode opposed to that on which the incident electrons strike. Referring to FIG. 1, the transducer anode can comprise a supporting layer 33 and a metallic layer 34. The support layer 33 comprises a sheet-like, relatively rigid material characterized by:

(1) being relatively radiation insensitive,
(2) having one face such as 36 substantially smooth, and preferably having both faces such as 36 and 37 substantially smooth,
(3) being composed substantially of elements having atomic numbers below 16 (for example, hydrogen, carbon and oxygen in an organic polymer), and
(4) having tensile and shear strength characteristics such that pressure differentials up to about 14.7 pounds per square inch gauge can be uniformly applied to one face thereof (for example, face 37) without causing rupture of the window 11 (as when the transducer anode 11 is mounted in an electron beam generating and controlling apparatus at the end opposite the cathode).

Examples of sheet-like relatively rigid supporting layers which provide suitable heat dissipation, X-radiation, transmissivity and dimensional stability include organic films, such as polyester and the like; glasses, such as ribbon glass and the like; and thin metal foils, such as beryllium, and the like. For example, in a transducer anode, spanning an aperture of about 0.15 cm. wide by 7 cm. long, one can employ a supporting layer which has a tensile strength of at least about 20,000 p.s.i. Commonly, thicknesses for such a layer 33 range from about 10 to 40 microns.

Integral with one face (e.g. face 36) of the supporting layer 33 is the metallic layer 34. Such layer 34 can be conveniently deposited upon layer 33 by vacuum vapor deposition techniques or the like. This metallic layer 34 is characterized by:

(1) being composed substantially of metal having atomic numbers above 50 (e.g. the so-called heavy metals),
(2) having a substantially uniform thickness and density,
(3) being substantially non-volatile and nonreactive at ambient temperatures when exposed to vacuum pressures in excess of about $10^{-2}$ mm. Hg.

Examples of suitable metals for use in layer 34 include gold, silver, platinum and the like. The thickness of such metallic layer is preferably from about ½ to ¾, the penetration range of the incident electron's energy.

In general, the thickness of the metallic layer in a transducer anode should be about one-half the penetration range of an incident electron beam. An accelerating potential greater than about 35 kv. is required, for example, to penetrate a 0.3 mil thick aluminum metal foil. In general, it is preferred that an incident beam have an associated energy less than that necessary to produce an appreciable electron output from the atmospheric (high pressure) side of a transducer anode. To those skilled in the art, it will be apparent that, the higher the energy of an incident electron beam, the greater the penetration of same into a transducer anode.

Naturally, it is preferred to use a transducer anode construction which will have associated with it a maximum efficiency of conversion of electrons into X-rays, and at the same time, will produce X-rays which have a zone of intensity not excessively greater than the cross-sectional diameter of the incident electron beam. In general, it is always preferred to use transducer anodes in which the metallic layer 34 is composed of elements of high atomic number while the supporting layer 33 is composed of low atomic number elements so as to promote the production of a narrow bandwidth of X-rays. Those skilled in the art will appreciate that the efficiency of conversion of electrons into X-rays by means of a transducer anode is characteristically low.

The last element used in this invention (as indicated above) is photon sensing means which, as those skilled in the art will appreciate, can conveniently be any conventional photo sensitive device, such as a photocell, photomultiplier, or the like.

The practice of this invention is illustrated by reference to FIGS. 1 and 2, each of which illustrates a different readout configuration within the teachings of this invention. In the configuration illustrated by FIG. 1, a prerecorded medium 14 is used, while in the configuration illustrated by FIG. 2, a prerecorded medium 26 is employed.

In FIG. 1, there is seen an incident electron beam 10 which impinges upon one face of a transducer anode 11. The transducer anode 11 acts as an electron-X-ray transducer and converts the energy of the incident electrons into X-rays 13. X-rays 13 emanating from the opposed face of transducer anode 11 are then allowed to impinge upon one face of a prerecorded sheet-like fluorescent medium 14.

In FIG. 1 the prerecorded medium 14 is shown for illustration purposes as a two-layered construction consisting of a layer 16 of fluorescent material and a layer 17 of prerecorded (i.e., differentially imaged) material. The layer 17 is thus imaged in regions such as 18 and is substantially unimaged in regions such as 19. Imaged regions 18 are non-transmissive (e.g. absorb a percentage) of photon energy of wave lengths emitted from fluorescent layer 16 while areas 19 are substantially transmissive (e.g. absorb very little) of such characteristic photon energy output from fluorescent layer 16 (when such layer 16 is excited to fluoresce).

When X-rays 13 uniformly strike layer 16, photon energy is generated. That photon energy which strikes imaged region 18 is at least largely absorbed thereby, but that which strikes unimaged areas 19 is mostly transmitted therethrough, so that differential photon energy emission 21 from face 22 of medium 14 results. Photon sensing means 23, such as photomultiplier or the like, detects such energy 21 and converts same into an electrical output which is representative of the originally recorded information.

It will be appreciated that when one practices this invention using a configuration such as illustrated in FIG. 1, it is desirable to employ imaging layers which are especially adapted for the selective absorption of photon energy generated by the adjoining fluorescent layer when such layer is excited by X-rays to fluoresce. In this configuration the imaging layer then serves as a selective filter of photon energy.

For this FIG. 1 configuration, suitable fluorescent materials include inorganic phosphors such as zinc sulfide, zinc cadmium sulfide, calcium tungstate, barium lead sulfate, thallium and activated sodium iodide, and organic scintillators such as napthalene, chlornaphthalene, terphenyl, anthracene, phenanthrene, styrene, 3,4-dimethylstyrene and stilbene (each dissolved in a suitable solvent). Similarly, suitable imaging layers include vesicular diazo (see, for example, U.S. Pat. No. 2,950,194), conventional halide emulsions, thermographic materials (see, for example, 2,740,896 and 3,094,417), diazo materials (see, for example, U.S. Pat. Nos. 2,829,976, 2,807,545; 2,755,-185; 2,744,669 and 2,691,587) and the like.

Figure 2:
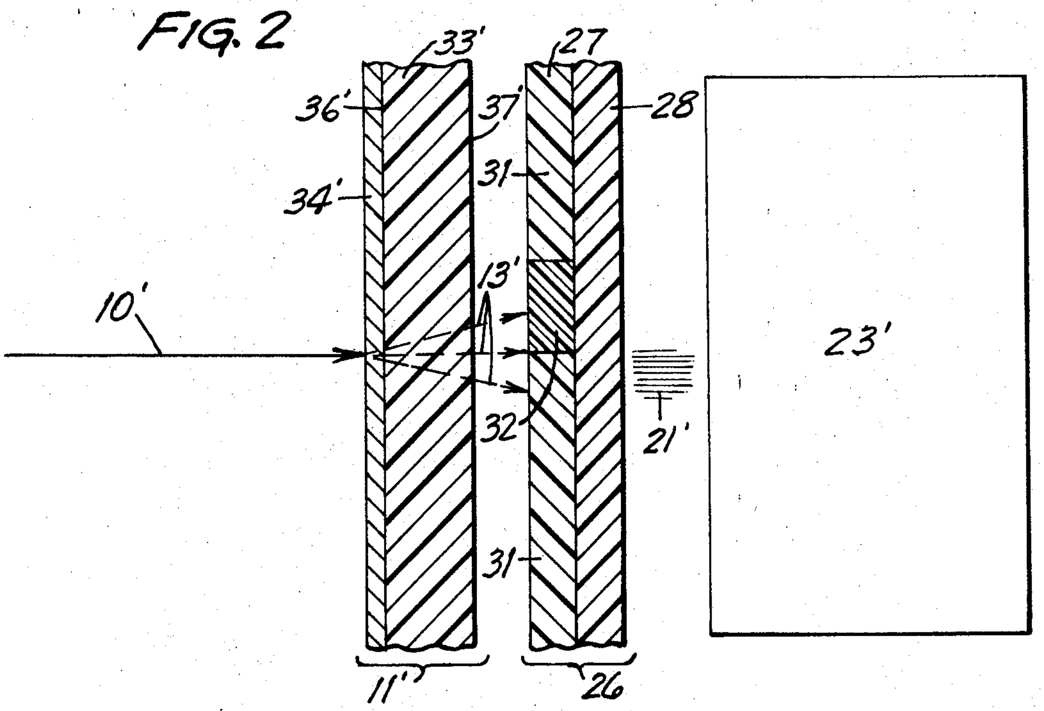
FIG. 2 is a view similar to FIG. 1 but illustrating an alternative embodiment.

FIG. 2 is a view similar to FIG. 1, but shows a different readout configuration within the teachings of this invention. Here, in a prerecorded medium construction 26, the relative spatial positions of a fluorescent layer 28 and a differentially imaged layer 27 are reversed (compared to the positions of the differentially imaged layer 17 and the fluorescent layer 16 in the prerecorded medium construction 14 of FIG. 1).

For convenience, in FIG. 2, elements similar to those in FIG. 1 are numbered identically except that prime marks are added thereto.

Referring to FIG. 2, when X-rays 13' from transducer anode 11' strike prerecorded medium 26, they enter the imaged layer 27. Imaged layer 27 is composed of substantially unimaged areas 31 and imaged areas 32. X-rays striking the unimaged areas 31 lose very little (relatively) of their energy in passing therethrough and proceed through the imaged layer 27 and into the fluorescent layer 28 where they induce the layer 28 to fluoresce and give off photon energy. However, X-rays 13' striking imaged areas 32 are at least partially absorbed thereby so that the relative intensity or quantity per unit area of transducer anode of any X-rays passing through the imaged area 32 is smaller or lesser than the relative intensity of the X-rays which pass through the unimaged areas 31. When these X-rays of reduced intensity strike the fluorescent layer 28, they generate photon energy, but the amount of photon energy generated, being proportional to the energy and quantity of the exciting X-radiation, is less than that generated by the energy and quantity of the X-rays reaching the fluorescent layer 28 through the unimaged areas 31 of imaged layer 27. As a result, a differential pattern of photon energy 21' issues from the prerecorded medium 26 on that side thereof which is opposed to the area of incident X-radiation 13'. Such differential pattern of photon energy 21' is conveniently sensed by means of a photon detecting means 23' in the manner previously explained for photon sensing means 23.

In the configuration shown in FIG. 2 where the prerecorded imaging layer is interposed between the fluorescent layer and the X-rays, the imaging layer serves as a filter for X-radiation as opposed to photon radiation while the fluorescent layer serves as an energy transducer for converting X-radiation into photon radiation. In this configuration, one depends on the differential absorption of X-rays in the imaging layer to be readout by photon energy. Such energy has a longer wave length than X-rays and is capable of being sensed by a photomultiplier.

For this configuration, the fluorescent layers can be the same just as those indicated above while suitable imaging layers include metal-diazonium (see, for example, U.S.P. 2,670,690), photo-conductive materials (see, for example, U.S.P. Nos. 3,010,883, 3,010,884, 3,011,963), electrophotographic materials (see, for example, U.S. Pat. Nos. 2,297,641, 2,357,809 and subsequent Xerox type art), and the like.

In general, any medium construction having an imaging material and a fluorescent material as described above can be used in this invention so long as the medium construction has the capacity to convert a uniform localized pattern of X-rays into a differential photon energy output. Thus, in place of either the configuration illustrated in FIG. 1, or that illustrated in FIG. 2, one can use a unitary construction in which the imaging material and the fluorescent material are generally homogeneously mixed together. Also, it is not necessary for a medium construction useful in this invention to be photon-energy transparent, or for the differential photon energy output from an X-ray excited, prerecorded medium to be sensed on the side of such medium opposed to that against which incident X-rays strike, though this latter situation is certainly preferred. For example, with a mirror in combination with a photon sensing device, one can collect a differential photon energy output from the same side of a prerecorded medium as that against which the X-rays impinge in the manner taught by this invention.

Figure 3:
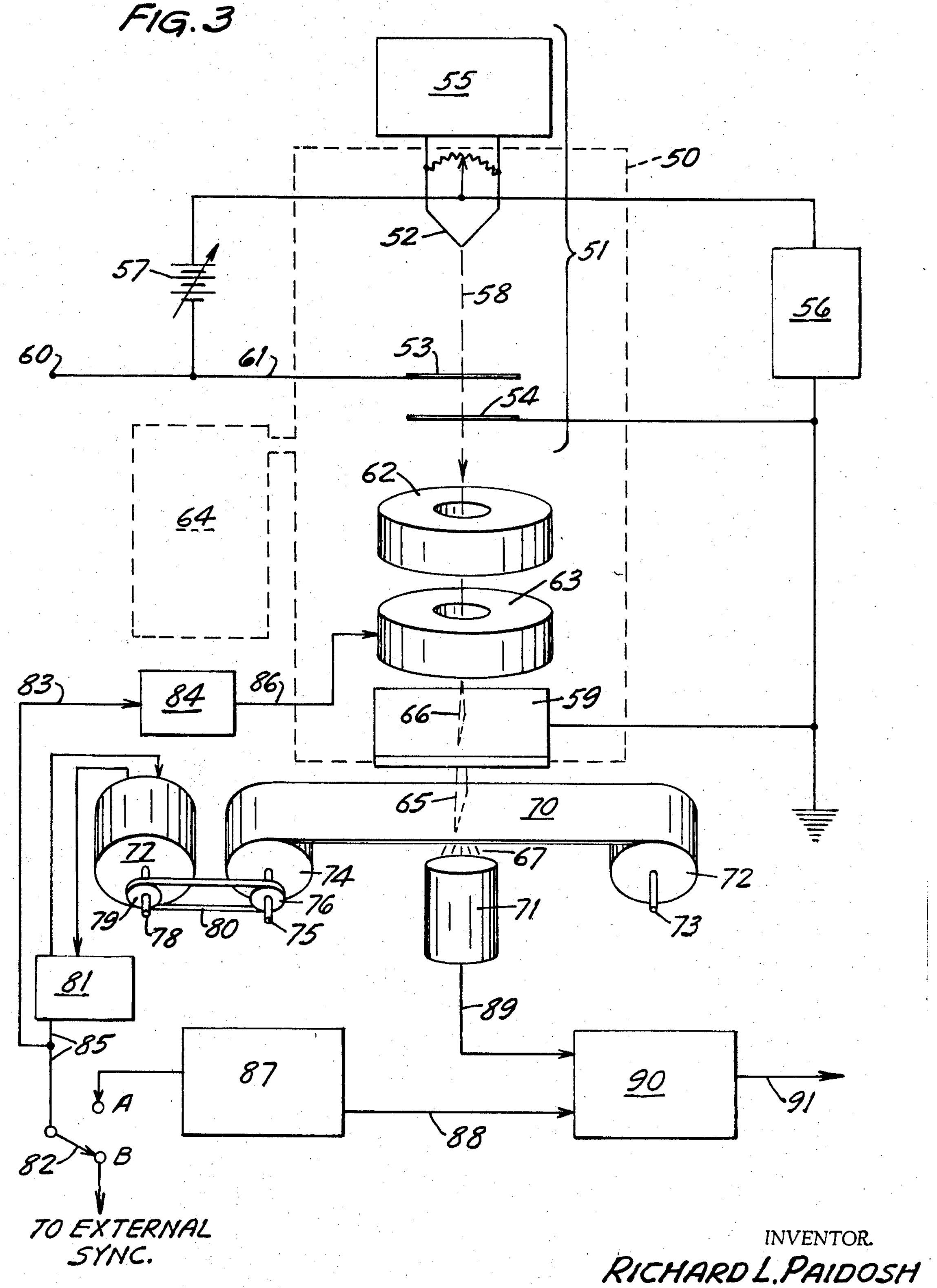
FIG. 3 is a diagrammatic illustration of one embodiment of apparatus of the present invention.

Considering now the apparatus of FIG. 3, an evacuatable chamber, designated generally as 50, houses an electron gun assembly designated in its entirety as 51. The electron gun assembly 51 includes a triode type electron gun having as functional elements a tungsten filament cathode 52, a control grid 53 having an aperture (not shown) therethrough, and an anode 54 having an aperture therethrough (not shown). Electrical current is supplied to cathode 52 from a cathode supply source 55. For purposes of illustration, cathode 52 is considered to be at a high negative voltage potential relative to anode 54, with the voltage potential therebetween being supplied by a conventional electrical source 56. Control grid 53 is biased so as to be at a slightly more negative potential relative to cathode 52, and this potential can be supplied by an electrical source, for example, a battery 57. Cathode 52 produces a stream of electrons designated as 58 which are accelerated towards anode 54 due to the voltage potential existing therebetween. This stream of electrons 58 is accelerated through the aperture of anode 54 along the equivalent optical axis not separately shown of the assembly 51 to bombard a transducer anode 59 (described previously in FIGS. 1 and 2). Transducer anode 59 is positioned in a suitably formed aperture in evacuatable chamber 50, transducer anode 59 being in sealing engagement with chamber 50. The transducer anode 59 produces X-rays when bombarded by the electron stream 58. Transducer anode 59 is maintained at approximately ground potential and the anode 54 is also maintained at the same potential by appropriate electrical interconnections, as shown in the diagram. Control grid 53 is given an applied potential which causes the intensity of electron stream 58 to vary in a predetermined manner, and thereby modulates the intensity of the electron stream 58. Thus, an input signal capable of varying the potential of grid 53 is applied thereto via an input 60 and conductor 61 to the grid 53.

The electron stream 58 is focused to a narrow electron beam 66 by a focus coil 62 which is energized by a conventional focus coil supply (not shown). The so-focussed electron beam 66 can be deflected in a scan pattern by a deflection yoke 63. To so deflect beam 66, a modified TV scanning method is used, wherein, the normal vertical scan signal is deleted and a single horizontal line scan results which is manually positioned within the longitudinal dimension of the transducer anode 59. The focus coil 62 and the deflection yoke 63 can be totally immersed or positioned around the periphery of the evacuatable chamber 50 and are each axially aligned with the electron optic axis of assembly 51.

The evacuatable chamber 50 is pumped to a vacuum typically in the range of about $10^{-4}$ to $10^{-6}$ mm. of Hg. Such a vacuum may be obtained by utilizing a vacuum pumping means 64, comprising, for example, a conventional diffusion pump operatively connected to a mechanical fore pump, which pumping means 64 is connected to the evacuatable chamber 50.

Located outside of chamber 50 in proximity to but spaced from transducer anode 59 is a photon sensor 71 such as a photomultiplier or the like.

A recording medium 70, such as one having stored information therein is positioned between the transducer anode 59 and photon sensor 71. The recording medium 70, as explained above in reference to FIGS. 1 and 2, when irradiated by X-rays from the transducer anode 59 is capable of producing photon energy at various levels (i.e. differential photon energy), the various levels of photon energy being determined by the differential absorption characteristics of the media representing the stored information. Recording medium 70 is supplied from a supply reel 72 which is rotatably mounted on a shaft 73. A take-up reel 74 is disposed relative to supply reel 72, transducer anode 59, and photon sensor 71 for taking up the recording medium 70 after it has been moved past transducer anode 59. Reel 74 is rotatably mounted on a shaft 75 which has a driven pulley 76 mounted thereon. Movement of the drive pulley 76 in a counterclockwise direction causes the take-up reel 74 to pull the recording media 70 from supply reel 72, adjacent the exposed face of transducer anode 59 but in front of photon sensor 71 and onto take-up reel 74. A motor 77 has a driven shaft 78 having a drive pulley 79 mounted thereon. A belt 80 is operatively coupled between driven pulley 76 and drive pulley 79. When the motor 77 drives shaft 75 in a counterclockwise direction, the supply reel 72 is driven in a counterclockwise direction to advance successive portions of recording medium 70 between the transducer anode 59 and the photon sensor 71.

The motor 77 is preset and maintained at a fixed rotational velocity by a constant velocity feedback servo system 81. The servo system 81 derives its basic reference input via line 85 and a simple single pole two-position switch 82. The switch 82 is placed in position B for record operaton and position A for readout operation. The reference signal impressed on line 85 is fed via line 83 to a combination scan generator-amplifier 84. The output of the scan generator-amplifier 84 is fed via line 86 to the yoke 63 to produce the modified single line scan described earlier. The synchronizing generator 87 applied the synchronizing pulse via conductor 88 to an amplifier and mixer circuit 90. Concurrently, the photon sensor 71 receives photon energy from the irradiated recording media and produces electrical signals as a function of the received photon energy levels. The photon sensor 71 applied electrical signals via conductor 89 to the amplifier and mixer circuit 90. The amplifier and mixer circuit 90 amplifies the electrical signals from the photon sensor 71. Thereafter, the amplified signals are mixed, in a predetermined manner, with the synchronizing signals received from the synchronizing generator 87 to produce a composite synchronized output signal appearing on output conductor 91.

This apparatus may be used for either recording of information in a recording medium, or for reading out or retrieving information stored in a prerecorded recording medium.

During a readout operation, the electron beam 58 produced by the electron gun 51 is unmodulated due to the absence of an input signal on input 60. The unmodulated electron beam 58 is focused by focus coil 62 and scanned, in a predetermined scan pattern, across the transducer anode 59. The transducer anode 59 converts or transduces the bombarding electron beam 58 into X-rays 65. The X-rays 65 scan and irradiate the recording medium 70 positioned between the transducer anode 59 and the photon sensor 71. The recording medium 70, when irradiated by the X-rays, produces differential photon energy 67 which is representative of the stored information.

Motor 77 continually drives take-up reel 74 so that successive sections of the recording media 70 are continually interposed between the transducer anode 59 and the photon sensor 71. The photon sensor 71 produces a continual output of electrical signals representative of the stored information. The synchronizing generator 87 produces synchronizing signals to motor drive system 81, the scan generator-amplifier 84 and the amplifier and mixer circuit 90. The amplifier and mixer circuit 90 continually amplifies the electrical signals applied thereto from the photon sensor 71 and synchronizes said amplified electrical signals with the synchronizing pulses received from synchronizing generator 87.

Typical values of one embodiment for both a record and readout system are set forth in the following example. This invention is further illustrated by reference to the following illustrative but non-limiting examples:

EXAMPLES

The recording media used in this example are each composed of three layers, a base layer of a dense kraft paper about 80 microns ($\mu$) in thickness, a foil layer laminated to one face of the base layer (e.g. an aluminum foil about $7.5\mu$ in thickness) and a second laminated layer on the other face of the base layer comprising a photoconductive zinc oxide having a wet coating thickness of about $50\mu$. The recording media is in the form of a continuous strip material capable of being stored on a reel and having a width of about 7.5 centimeters (cm).

In this example, the apparatus used is like that illustrated in FIG. 3. The electron gun assembly has a voltage of approximately 25 kilovolts (kv.) impressed between the anode and filament, and the electron beam current without an input signal averages about 100 microamperes ($\mu$a.). The beam spot size at the transducer anode is about $125\mu$. The transducer anode has an overall dimension of about 0.15 cm. by 7 cm. The support layer is a layer about $25\mu$ thick polyethylene terephthalate vacuum vapor coated on its high vacuum face with a gold layer about 0.15 to $0.20\mu$ in thickness. When this transducer anode is bombarded by the above-described electron beam, a beam of X-rays having a diameter of about 250 microns is produced on the atmospheric or polyethylene terephthalate side of the transducer anode.

To record information in a medium, a medium is positioned with its imaging layer adjacent the transducer anode with about 1 mil spacing therebetween. The medium is moved past the transducer anode at a vertical rate of about 1.2 cm./sec. The electron beam intensity modulated with information to be recorded is scanned transversely across the transducer anode at a frequency of about 1 kilocycle (kc). The medium is thus exposed by the X-rays from the transducer anode so that there is recorded therein a series of transversely spaced scan lines in a raster pattern so as to form a latent image of the information with which the electron beam is modulated. The resulting exposed recording medium is then developed as desired. After development, a thin layer of fluorescent material, for example, calcium tungstate, dispersed in a copolymer comprising 87 mol percent vinyl chloride and 13 mol percent vinyl acetate is knife coated over the (developed) imaging layer in the medium.

For readout, the electron gun has about 20 kv. impressed between the anode and filament and the unmodulated electron beam current is about 50 $\mu$a. with a spot diameter of about 125 microns and a scan rate of about 1 kc. The unmodulated beam is scanned across the transducer anode causing X-rays to scan across the prerecorded medium which is advanced at the rate of about 1.2 cm./sec. The photon detector is a photomultiplier tube RCA type 1P28 having a photo sensitive face. The photomultiplier tube converts the received photon energy into electrical signals and applies the same to the amplifier and mixer circuit 90 (see FIG. 3) to be mixed with the synchronizing signals from the synchronizing generator 87. The resulting synchronized output signal appearing on output conductor 91 can be applied to a transmission line, a video monitor or the like.

Results are summarized in Table I following page.

TABLE I

| Example No. | Medium construction: Imaging material | Medium construction: Backing material | Development | Fluorescent material coating (6) | Readout |
|---|---|---|---|---|---|
| 1 | Zinc oxide [1] | Paper aluminum foil laminate.[1] | Electrolytic [1] (3M) | Calcium tungstate | Image formed. |
| 2 | do.[3] | Paper | Electrostatic toner powder deposition.[4] | do | Do. |
| 3 | Cadmium sulfide [2] | do | do.[4] | do | Do. |
| 4 | Silver halide emulsion [5] | Polyester | Conventional developing and fixing. | P-11 phosphor | Do. |

[1] The zinc oxide medium construction is prepared and developed as described in Example 1 of U.S.P. 3,213,003, having 4:1 pigment to binder ratio.
[2] Medium construction similar to Example 1 except zinc oxide photoconductor was replaced by cadmium sulfide photoconductor and finally coated on white bond paper.
[3] The zinc oxide medium construction is similar to that prepared and described in Greig U.S.P. 3,052,539 and 3,052,540.
[4] The electropowder procedure used is substantially the same as described in U.S.P. 3,052,539 and 3,052.540. The procedure used here was to initially charge the paper up to a surface potential ranging from about 400 to 600 volts. Thereafter the paper was immediately passed by the transducer anode as described in Example 1. Immediately thereafter, the so-exposed medium is dusted with electrostatic toner powder and fused to the medium by means of a modified hair dryer.
[5] Kodak fine grain positive photographic film.
[6] In all cases the fluorescent material indicated is admixed with Pliolite S-7, a trademark of Goodyear Company for butadiene styrene copolymer.

I claim:

1. A readout method adapted for retrieval of information from a prerecorded medium using a transducer anode, said prerecorded medium being capable of differentially emitting photon energy from one face thereof in a manner representative of said prerecorded information when a prechosen portion of such medium is generally uniformly struck by X-rays, said transducer anode being capable of converting a uniform beam of electrons striking a portion of one face thereof into a beam of relatively columnated X-rays emanating from a corresponding portion of the opposed face thereof, said method comprising the steps of (a) locating a said medium in proximity to such opposed face of a said transducer anode;
(b) simultaneously scanning such one face of a said transducer anode with an electron beam so as to generate a beam of X-rays from such opposed face, and
(c) simultaneously sensing the photon energy emitted from one face of a said medium thereby to retrieve the prerecorded information.

2. The method of claim 1 wherein, simultaneously as said so-treated medium is being uniformly irradiated by X-rays, the differential photon energy emitted from such medium is sensed and converted into an electric signal which is representative of the originally recorded information.

3. A method for recording and retrieving information using a sheet-like fluorescent recording medium, said medium containing both an imaging material and a fluorescent material, the fluorescent material being so distributed within said medium as to be uniformly emissive of its characteristic photon energy output relative to one face of such medium, the imaging material in said medium being capable of selectively altering its capacity to transmit such characteristic photon energy output of such fluorescent material when imaged as a result of a recording operation, said method comprising the steps of:

(a) positioning a said medium in proximity to a transducer anode and controllably moving such medium past such transducer anode;
(b) moving an electron beam modulated with information to be recorded across one face of such transducer anode, thereby to create differential X-radiation from such transducer anode and effect selective changing of the photon emissive property of a said medium relative to one face thereof in a manner representative of such information;
(c) developing the so-exposed medium so as to render such medium relatively insensitive to further X-radiation;
(d) thereafter repositioning the so-developed medium in proximity to such transducer anode and controllably moving such medium past such transducer anode;
(e) simultaneously moving a substantially uniform electron beam across one face of such transducer anode, thereby to create uniform X-radiation from such transducer anode and effect selective photon emission from said so-developed medium, and
(f) simultaneously sensing such emitted differential photon energy and converting same into an electrical signal output which is representative of the originally recorded information.

4. An information retrieval apparatus wherein the information on a prerecorded medium is reproduced as an electrical signal representative of the prerecorded information, said apparatus comprising:

(1) a housing defining an evacuable chamber;
(2) a transducer anode window within one wall of said housing, said window including
    (a) a metallic layer composed of an element of high atomic number for converting impacting electrons into X-rays;
    (b) a support layer composed of an element of a low atomic number and being relatively radiation insensitive so as to promote the production of a narrow bandwidth of X-rays from said metallic layer;
(3) electron beam generating means, within said housing, for producing and directing a beam of electrons toward said transducer anode window;
(4) deflecting means within said housing for focusing and scanning said electron beam in a predetermined scan pattern across said transducer anode window;
(5) a prerecorded medium positioned outside of said housing and adjacent said transducer anode window, said medium including
    (a) a layer of fluorescent material for receiving X-rays from said metallic layer and producing photon energy in response to said received X-rays, and
    (b) a layer of differentially imaged material to transmit photon energy therethrough in a differential relationship relative to the imaged information thereon;
(6) photon sensing means positioned adjacent to said medium for receiving the transmitted differential photon energy from said medium and converting said transmitted differential photon energy into an electrical signal representative of the information on said prerecorded medium.

5. The apparatus of claim 4 further including transporting means for transporting said medium in a predetermined manner relative to said transducer anode window.

6. The apparatus of claim 5 further including synchronization means operatively connected to said transporting means and said deflecting means for correlating the movement of said medium relative to said predetermined scan pattern.

7. The apparatus of claim 6 wherein said synchronizing means further correlates said photon sensing means with said transporting means and said deflecting means.

References Cited

UNITED STATES PATENTS

| | | | |
|---|---|---|---|
| 3,418,470 | 12/1968 | Birkeland | 250—65 |
| 3,056,025 | 9/1962 | Burrill | 250—65 |
| 3,303,341 | 2/1967 | Fram et al. | 250—65 |

ARCHIE R. BORCHELT, Primary Examiner

A. L. BIRCH, Assistant Examiner

U.S. Cl. X.R.

346—74

UNITED STATES PATENT OFFICE
CERTIFICATE OF CORRECTION

Patent No. 3,527,943 Dated September 8, 1970

Inventor(s) Richard L. Paidosh

It is certified that error appears in the above-identified patent and that said Letters Patent are hereby corrected as shown below:

Column 3, line 7, "systemmatically" should read -- systematically --. Column 5, line 11, "2,744,669" should read -- 2,774,669 --. Column 6, line 54, "focussed" should read -- focused --. Column 7, line 34, "operaton" should read -- operation --.

Signed and sealed this 17th day of November 1970.

(SEAL)
Attest:

EDWARD M.FLETCHER,JR.
Attesting Officer

WILLIAM E. SCHUYLER, JR.
Commissioner of Patents